US011920631B2

(12) United States Patent
Schueler et al.

(10) Patent No.: US 11,920,631 B2
(45) Date of Patent: Mar. 5, 2024

(54) HYDRODYNAMIC SLIDE BEARING

(71) Applicant: MIBA Industrial Bearing Germany GmbH, Goettingen (DE)

(72) Inventors: Eckhard Schueler, Adelebsen (DE); Olaf Berner, Northeim (DE)

(73) Assignee: MIBA Industrial Bearings Germany Osterode GmbH, Osterode (DE)

( * ) Notice: Subject to any disclaimer, the term of this patent is extended or adjusted under 35 U.S.C. 154(b) by 252 days.

(21) Appl. No.: 17/617,346

(22) PCT Filed: Jun. 25, 2020

(86) PCT No.: PCT/EP2020/067865
§ 371 (c)(1),
(2) Date: Dec. 8, 2021

(87) PCT Pub. No.: WO2021/004803
PCT Pub. Date: Jan. 14, 2021

(65) Prior Publication Data
US 2022/0228624 A1 Jul. 21, 2022

(30) Foreign Application Priority Data
Jul. 8, 2019 (DE) .................... 10 2019 118 440.1

(51) Int. Cl.
*F16C 17/03* (2006.01)
*F16C 17/06* (2006.01)
(Continued)

(52) U.S. Cl.
CPC .............. *F16C 17/03* (2013.01); *F16C 17/06* (2013.01); *F16C 33/1065* (2013.01);
(Continued)

(58) Field of Classification Search
CPC ........ F16C 17/03; F16C 17/035; F16C 17/06; F16C 17/065; F16C 32/0659; F16C 32/0666; F16C 33/1065; F16C 37/002
See application file for complete search history.

(56) References Cited

U.S. PATENT DOCUMENTS 1,597,429 A * 8/1926 Brincil ..................... B21K 1/04
29/898.059
4,323,286 A * 4/1982 Vohr ..................... F16C 33/108
384/317
(Continued)

FOREIGN PATENT DOCUMENTS

DE 3428846 4/1985
DE 3617087 11/1987
(Continued)

OTHER PUBLICATIONS

Japanese Office Action dated Feb. 1, 2023.
(Continued)

*Primary Examiner* — Phillip A Johnson
(74) *Attorney, Agent, or Firm* — Gerald E. Hespos; Michael J. Porco

(57) ABSTRACT

A hydrodynamic slide bearing (10, 10') supports a shaft (14, 14') that is mounted rotatably. The hydrodynamic slide bearing (10,10') comprises a plurality of bearing segments (12, 12') arranged next to one another in the rotation direction (22, 22'). The segment surfaces together form a running surface (16, 16') for the shaft (14, 14'). At least one bearing segment (12, 12') has a plurality of grooves (26, 26') disposed in its segment surface, and the grooves (26, 26') are orientated substantially transverse to the rotation direction (22, 22'). The rear groove edges (261) in the rotation direction (22, 22') are orientated obliquely to their respective assigned radial plane (24, 24') and are undercut in relation to their respective assigned radial plane (24, 24'). The front
(Continued)

groove edges (262) in the rotation direction (22, 22') are not undercut and are orientated obliquely to their respective assigned radial plane (24, 24').

10 Claims, 2 Drawing Sheets

(51) Int. Cl.
*F16C 33/10* (2006.01)
*F16C 37/00* (2006.01)

(52) U.S. Cl.
CPC ........ *F16C 37/002* (2013.01); *F16C 2240/30* (2013.01); *F16C 2240/42* (2013.01)

(56) References Cited

U.S. PATENT DOCUMENTS

| | | | |
|---|---|---|---|
| 4,538,929 A | 9/1985 | Ehrentraut et al. | |
| 4,746,230 A * | 5/1988 | Jensen | F16C 17/03 384/321 |
| 5,746,516 A | 5/1998 | Miyasaka et al. | |
| 9,341,211 B2 | 5/2016 | Aubele et al. | |
| 2006/0257059 A1 | 11/2006 | Kubota et al. | |
| 2014/0377063 A1 | 12/2014 | Guerenbourg et al. | |
| 2015/0159692 A1 | 6/2015 | Dourlens et al. | |
| 2015/0192172 A1 | 7/2015 | Maier et al. | |
| 2019/0128325 A1 | 5/2019 | Amano et al. | |

FOREIGN PATENT DOCUMENTS

| | | | | |
|---|---|---|---|---|
| DE | 3706571 | | 9/1988 | |
| DE | 102008000853 | | 10/2009 | |
| DE | 202009014649 U1 | * | 4/2010 | ............ F16C 17/045 |
| EP | 0246424 A2 | | 11/1987 | |
| EP | 420478 A | * | 4/1991 | ............. F16C 17/06 |
| GB | 664426 | | 1/1952 | |
| JP | 58-38036 | | 9/1956 | |
| JP | 48-4501 | | 2/1973 | |
| JP | 06147219 | | 5/1994 | |
| JP | 09144750 A | * | 6/1997 | |
| JP | H09144750 | | 6/1997 | |
| WO | WO-2018041578 A1 | * | 3/2018 | ............. F16C 17/03 |

OTHER PUBLICATIONS

Wikipedia: Dovetail Joint URL: https://en.wikipedia.org/wiki/Dovetail_joint (printed on Dec. 6, 2019).
International Search Report dated Nov. 10, 2020.

* cited by examiner

HYDRODYNAMIC SLIDE BEARING

BACKGROUND

Field of the Invention

The invention relates to a hydrodynamic slide bearing for supporting a shaft that is, when in its intended operation, rotatably mounted. The hydrodynamic slide bearing comprises a plurality of bearing segments arranged next to one another in the rotation direction. The segment surfaces of the bearing segments together form a running surface for the shaft. At least one bearing segment has a plurality of grooves in its segment surface orientated substantially, and in particular exactly, transverse to the rotation direction.

Related Art

The basic construction of hydrodynamic slide bearings is known to one skilled in the art and is disclosed for example in WO 2012/028345 A1. During operation, the shaft to be supported rotates with a small bearing gap between the shaft and the running surface of the bearing. The bearing typically is formed from a plurality of bearing segments staggered in the rotation direction of the shaft. The bearing gap is filled with an oil film to prevent direct contact between the shaft and the running surface. To establish the oil film, the bearing segments typically are separated from one another by oil supply regions. During operation, oil is introduced to at least a part of the width of the bearing segment via these oil supply regions. The oil is pulled along by the rotation of the shaft and is expressed at the sides. In addition to the above-mentioned lubrication effect, the oil film performs the essential task of cooling the bearing. Significant heat is generated due to the shear forces acting on the oil film. This heat is counteracted by the continuous oil exchange described above (distribution of fresh oil via the oil supply regions and lateral expression of the heated oil). I Hydrodynamic slide bearings typically have rapidly rotating shafts, and therefore sufficient and reliable heat dissipation poses a central design problem.

Some hydrodynamic slide bearings have a thrust bearing design in which the running surface is a plane oriented perpendicular to the axial direction of the shaft. Other hydrodynamic slide bearings have a radial bearing design in which the running surface is curved and oriented coaxially relative to the supported shaft. In the case of axial bearings, the bearing segments are formed essentially as circle ring sectors, between which radially oriented oil supply regions are arranged. In the case of radial bearings, the bearing segments are formed essentially as hollow cylinder sectors between which axially oriented oil supply regions are arranged. Combinations of both bearing types also are known to one skilled in the art. The present invention is not limited to a specific one of the above-mentioned variants. Moreover, slide bearings can be further divided into tilted pad bearings and fixed segment bearings, depending on the design of their segments.

AT 382215 B addresses the cooling problem mentioned above by proposing multiple shallow grooves in the running surface, oriented essentially parallel to the rotation direction. These grooves serve as local oil repositories to augment the total volume of the oil film. Thus, the total heat capacity is increased and heat dissipation is intended to be improved.

WO 2012/028345 A1 has running surface grooves oriented transverse to the rotation direction. However, WO 2012/028345 A1 does not refer to the above-mentioned cooling problem. Rather, the grooves are to serve as dirt traps for any dirt particles that manage to end up in the bearing gap and are intended to prevent the dirt particles from damaging the shaft surface or bearing running surface.

GB 664,426 A discloses as slide bearing with a running surface that has inserts made of a friction-reducing soft metal, such as lead or zinc GB 664,426 A. To this end, cylindrical or semi-cylindrical rod material is pressed into groove-like recesses in the blank workpiece that will form the bearing body and is held by a force-locked connection.

Similar slide bearings are known from US 2015/0192172 A1 and US 2006/0577059 A1, however graphite pieces that are fixed by form-locked connection in the grooves of the bearing body blank workpiece are used as friction-reducing material.

An axial slide bearing is known from DE 37 06 571 A1 discloses an axial slide bearing where the running surface has grooves for oil distribution and to catch and lead away any contaminants. One of the embodiments disclosed in DE 37 06 571 A1 has grooves with groove walls that are essentially vertical. The grooves have manufacturing-related undercuts in the foot region near the floor, however those undercuts are irrelevant for the functioning of the groove.

A slide bearing with a fundamentally similar construction is disclosed in DE 36 17 087 A1, which mentions in passing the fundamental possibility of an undercut groove form.

DE 34 28 846 A1, US 2015/015 9692 A1, JP 09144750 A and U.S. Pat. No. 5,746,516 A all disclose slide bearings with grooves that have vertical groove walls.

The present invention seeks to solve the problem of further developing a generic slide bearing such that improved cooling is ensured.

SUMMARY

A hydrodynamic slide bearing in accordance with the invention is provided for supporting a shaft that is mounted for rotation during operation. The slide bearing has bearing segments arranged next to one another in the rotation direction. The bearing segments respectively are provided with segment surfaces that together form a running surface for the shaft. At least one bearing segment has grooves formed in the segment surface and oriented substantially transverse to the rotation direction. The grooves are characterized in that the rear groove edges in the rotation direction are orientated obliquely to their respective assigned radial plane and are undercut in relation to their radial plane. Additionally, the front groove edges in the rotation direction are not undercut and are orientated obliquely to their respective assigned radial plane.

The invention is based on the insight that the thermal absorption of the oil film can be improved significantly when its laminar flow structure is intentionally disturbed locally. It has been shown that during operation, a clear temperature gradient arises in the oil film toward the segment end (in the rotation direction) from the cooler region near the shaft to the significantly warmer region near the bearing. Due to the laminar flow structure, this temperature gradient increases continuously in the sliding direction. The region near the bearing heats up significantly. Conversely, the region near the shaft remains relatively cool, i.e. its thermal absorption potential, and thereby its cooling potential, is not optimally exploited. The running surface grooves oriented in the rotation direction, as known from the prior art, change nothing about these interrelations. As explained at the outset, their cooling improvement effect is based on the principle of increasing volume, and thereby increasing heat capacity. The transverse grooves intended for other purposes, as known from the prior art, also leave the described flow relationships and therefore the temperature gradients in question as well largely unaffected. The present invention now provides for a special form of transverse grooves, however. These are distinguished by a particular inclination of their rear edge. This is undercut opposite the radial plane assigned to the considered groove edge. Any plane in which the central axis of the bearing or the axis of rotation of the shaft is located is referred to as a radial plane. The radial plane assigned to a special groove or groove edge is the radial plane in which, additionally, the considered position of the groove or groove edge lies. Here, 'undercut' means an angular orientation of the groove rear edge, which in the case of a groove front edge presumed to be vertical, would result in a width of the groove base being larger than the width of the groove opening. However, the premise of a vertical groove front edge, which is referred to solely for illustrative purposes, is not part of the present invention, which merely relates to the undercut design of the groove back edge opposite the assigned radial plane. On the contrary, as described in more detail below, the groove front edge also is oriented at an inclination (not undercut, however) relative to the radial plane assigned to it. As the inventors realized, undercutting the groove rear edge results in the efficient formation of a local turbulence in the oil film. This turbulence swirls the oil fractions of different temperatures and thereby results in a temperature equalization within the oil film. In this manner, the previously untapped thermal absorption potential of the cooler oil fractions that were trapped before the swirling due to the laminar flow in the region of the oil film near the shaft, can be exploited in the rotation direction behind the vortex. Therefore, without increasing the oil volume, the invention results in improved bearing cooling solely on the basis of a fuller exploitation of the thermal absorption potential of the oil film by means of a local layer intermixing.

Arranging the undercut groove edges at an angle from 5° to 20° relative to the respective radial plane assigned to each has proven especially efficient. This angle results in the intended effects; and at the same time, a corresponding groove with the preferred dimensions can be realized without excessive expenditure. Generally speaking, the groove depth h is preferably within the range between 0.05 and 0.5 millimeters. The groove width d (on the opening side) is within a comparable order of magnitude.

Having the grooves distributed not over the entire running surface, but rather concentrating them in the so-called pressure drop region of the slide bearing or that of each of its segments, has proven especially advantageous for the above-mentioned cooling mechanism. From a design perspective, this means that the grooves are preferably arranged in a groove arrangement region that begins, in the rotation direction, at 60-65% of the segment length and ends at 90-95% of the segment length. In other words, the groove arrangement region lies at the end of the segment facing away from the oil supply region responsible for this bearing segment. The particular efficiency of this arrangement is also based especially on the circumstance that the fresh, cool oil supplied via the oil supply region is increasingly heated during its transport in the rotation direction and by the time it enters the preferred groove arrangement region has built up a significant temperature gradient, which is then dissipated by cooling in the manner explained above.

The grooves can be arranged in a groove arrangement region that extends over the central 60-90% of the segment width. In other words, the grooves are concentrated in the central region of the running surface and do not project laterally as far as the segment edge. This prevents excessive outflow of oil through the grooves.

Within the groove arrangement region, the grooves preferably occupy 10-60%, especially 20-30%, of its area. The remaining area is occupied by ribs between the grooves.

The grooves of some embodiments are interrupted in their longitudinal extension direction. Therefore, in the longitudinal extension direction, the grooves may form partial grooves arranged adjacent to one another and respectively divided from one another by a transverse rib. This is advantageous in terms of the load capacity of the bearing, compared to embodiments with non-interrupted, extremely longitudinally extended grooves.

The interruptions, and therefore the transverse ribs may be arranged with an offset transverse to the rotation direction. Despite the groove interruption, this prevents the formation of a stripe within the groove arrangement region, oriented in the rotation direction, in which the swirling according to the invention does not occur. Rather, the swirling and improved cooling according to the invention occur over the entire width of the groove arrangement region.

The invention can be used in both axial as well as radial bearings. The possible applications apply to both fixed segment bearings as well as tilting pad bearings, in which the individual bearing segments are not arranged rigidly but rather so as to enable tilting movement. As is usual with conventional slide bearings made of multiple bearing segments, the slide bearings according to the invention also preferably have an oil supply region transverse to the rotation direction between every two adjacent bearing segments, separating them.

With regard to the distance between two adjacent groove rows, a certain dependence of this dimension upon the dimension of the slide bearing 10, 10' as such has proven favorable. For a radial bearing 10 with an inside diameter of 100 mm, a groove spacing distance of 0.5 mm to 2.5 mm, preferably approx. 1 mm, has proven advantageous. With a scaling factor of (D/100)0.5 where B=bearing diameter in millimeters, this dimension can be adjusted to other bearing sizes. For axial bearings, a spacing distance between two groove rows (measured at the groove center) of 0.4 mm to 1.6 mm, preferably 0.8 mm, resulted for bearings with a segment length of 30 mm in the circumferential direction. With a scaling factor of (L/30)0.5 where L=segment length in millimeters, this dimension can be transferred to axial bearings of different sizes.

Further details and advantages of the invention are given in the following specific description and the drawings.

DETAILED DESCRIPTION

Identical reference numbers in the Figures refer to identical or analogous elements.

Figure 1:
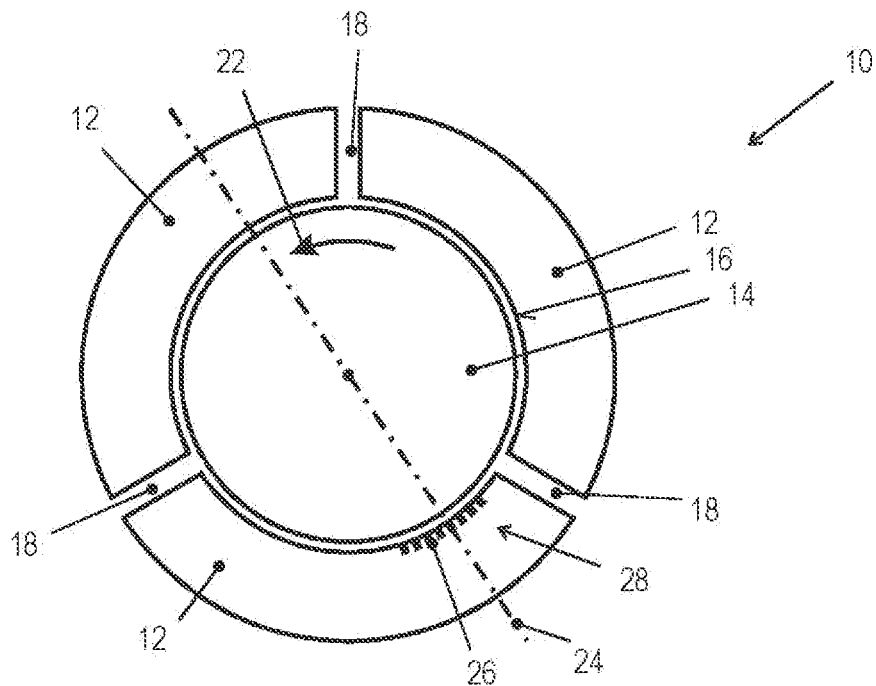
FIG. 1 is a schematic cross-section depiction of a slide bearing according to the invention with a radial bearing design.

In a highly schematized depiction, FIG. 1 shows a cross-sectional view of a slide bearing 10 according to the invention with a radial bearing design. In the embodiment depicted, the slide bearing 10 is assembled from three bearing segments 12, the concave inner segment surfaces of which together form a running surface 16 arranged coaxially to the supported shaft 14. Oil supply regions 18 are arranged respectively between the individual bearing segments 12 Oil can be pulled through the oil supply regions 18 and into the bearing gap 20 formed between the shaft 14 and the running surface 16, for lubricating and cooling. The movement direction arrow 22 indicates the rotation direction of the shaft 14. The dash-dotted line represents a radial plane 24.

The rear region of the segment surfaces of the lower load-bearing bearing segments 12, as viewed along the rotation direction of the shaft 14 have a groove arrangement region 28 with grooves 26 arranged thereon. The upper bearing segments 12 bear less load of the shaft 14 and do not have a groove arrangement region in the shown exemplary embodiment, however, a groove arrangement region would be entirely possible with other embodiments. It has been shown, however, that in radial bearings, the grooves 26 according to the invention are especially and mostly adequately effective primarily in the segment surfaces of the supporting segment(s). Typically, these are the lower one to two bearing segments.

Figure 4:
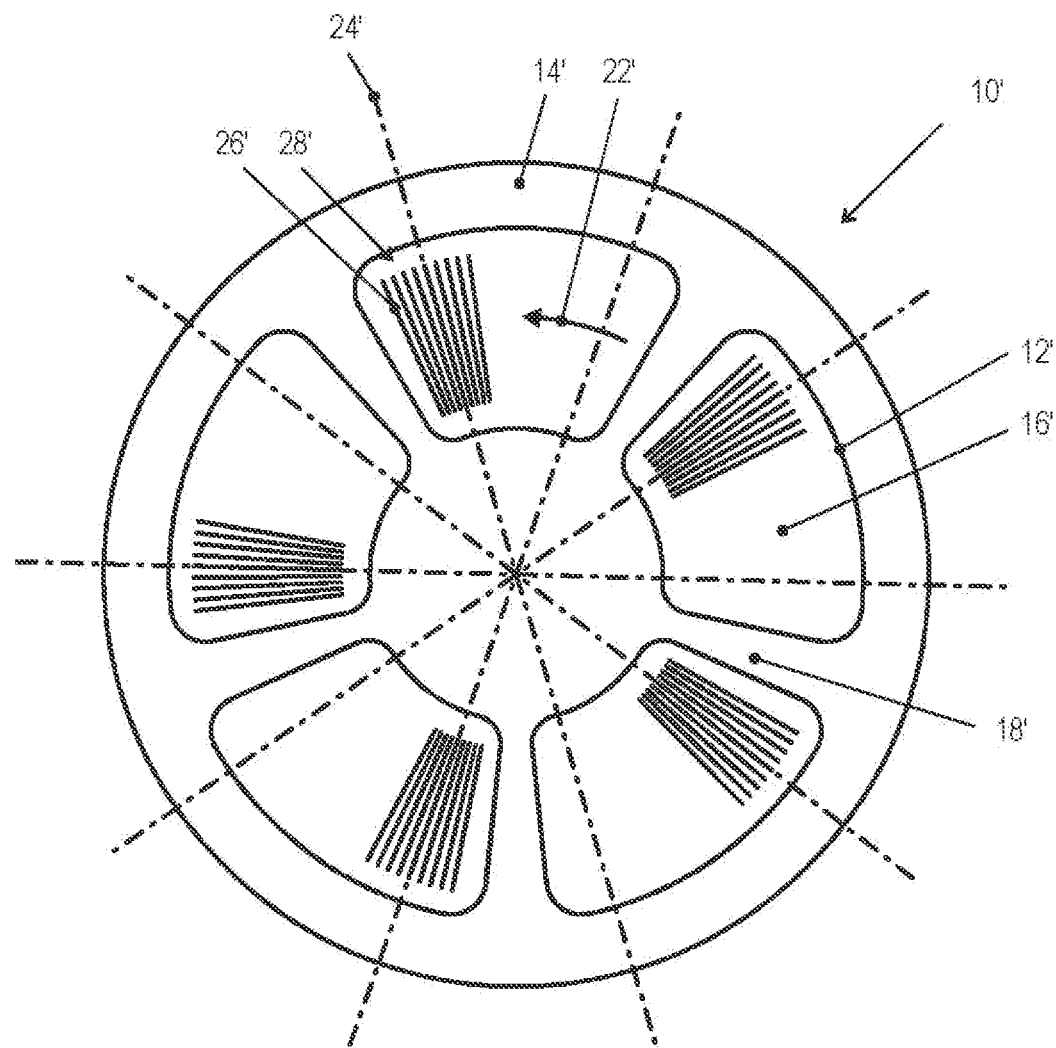
FIG. 4 is a schematic top view of a slide bearing according to the invention with an axial bearing design.

FIG. 4 shows a slide bearing 10' with an analogous construction in an axial design. The dashed reference symbols used in FIG. 4 correspond to the non-dashed reference symbols from FIG. 1, wherein the bearing gap located within or parallel to the drawing plane is not apparent in FIG. 4. For axial bearings, usually all bearing segments 12' carry an equal load, such that the grooves 26' according to the invention are typically present in the segment surfaces of all segments. For clarity of the drawing, structures that are present in all segments are not marked for every segment with reference symbols, but rather representatively on a single illustrated segment.

In the shown slide bearings 10, 10', each groove arrangement region 28, 28' extends respectively over a region that begins after approx. 65% of the segment length in the rotation direction of the shaft 14 and ends after approx. 90% of the segment length. The groove arrangement region is therefore arranged at a distance of approx. 65% of the segment length from the preceding oil supply region 18, 18' and of approx. 10% of the segment length from the following oil supply region 18, 18'.

Figure 2:
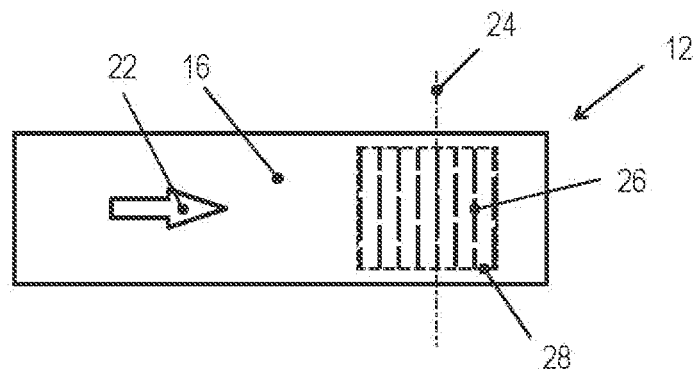
FIG. 2 is a schematic unrolled depiction of one of the bearing segments of the slide bearing from FIG. 1

As is evident for the axial bearing 10' from FIG. 4 and for the radial bearing 10 from FIG. 2, the groove arrangement region does not extend over the entire segment width. Rather, it merely occupies centrally approx. 90% of the segment width.

As is evident from FIG. 2, in the shown axial bearing 10, the grooves 26 are formed as grooves that are interrupted in their longitudinal direction. The groove interruptions of two respective grooves arranged adjacently in the rotation direction are offset from one another transverse to the rotation direction.

Figure 3:
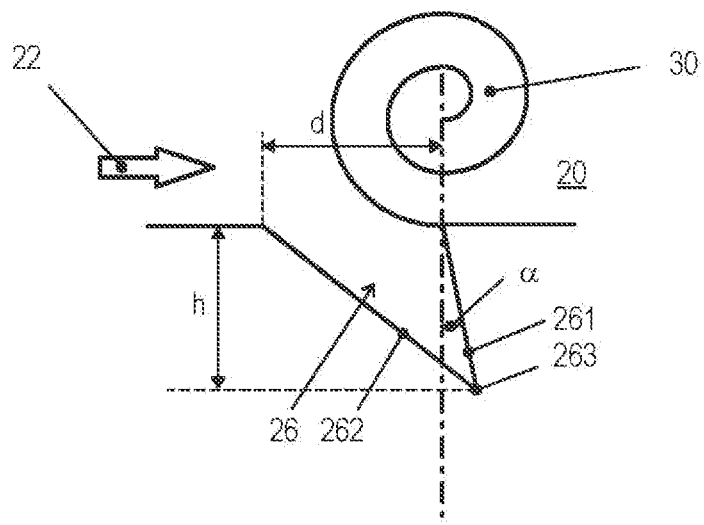
FIG. 3 is a schematic cross-section depiction of a groove of a slide bearing according to the invention.

FIG. 3 shows in detail, although in a highly schematic form, the fundamental form according to the invention of the grooves 26. This is characterized especially in that the rear groove edge 261, in the rotation direction, has an undercut with an undercut angle α opposite the assigned radial plane 24. The front groove edge 262 forms a comparatively slightly oblique surface that at the groove base 263, which is (insofar as is possible due to production technology) formed with an acute angle, abuts directly on the rear groove edge 261. In alternative embodiments, the groove base is not acute-angled but rather flat or formed with a radius, such that the front and rear groove edge 262, 261 do not directly meet one another there. Especially in such cases, a significantly steeper angle of the front groove edge 262 is conceivable. The effect of the undercut according to the invention is suggested by the swirl 30 in FIG. 3. The oil film flowing within the bearing gap 20 remains, so to speak, caught at the rear groove edge 261, such that its laminar structure is destroyed and it swirls. This results in an exchange of cooler oil fractions proximate to the shaft and warmer oil fractions proximate to the bearing. This results in a thermal equalization within the oil film, and this occurs in a bearing region in which the fresh oil fed in from the most recently passed oil supply region 18 is already significantly heated. Moreover, the chosen groove arrangement region 28 corresponds very precisely to the pressure drop region of the bearing.

Of course, the embodiments discussed in the description and shown in the figures are only illustrative exemplary embodiments of the present invention. This disclosure gives one skilled in the art a broad spectrum of possible variations. In particular, the number of the segments on which the grooves according to the invention are provided can vary.

REFERENCE SYMBOL LIST 10 slide bearing (radial bearing)
10' slide bearing (axial bearing)
12, 12' bearing segment
14, 14' shaft
16, 16' running surface
18, 18' oil supply region
20 rotation direction arrow
24, 24' radial plane
26, 26' groove
261 rear groove edge
262 front groove edge
263 groove base
28, 28' groove arrangement region
30 swirl
h groove depth
d groove width (on the opening side)

The invention claimed is:

1. A hydrodynamic slide bearing (10, 10') for supporting a shaft (14, 14') that is rotatable in a rotation direction about an axis, the slide bearing (10, 10') comprising:
a plurality of bearing segments (12, 12') arranged next to one another in the rotation direction (22, 22'), wherein the bearing segments (12, 12') have segment surfaces that together form a running surface (16, 16') for facing a surface of the shaft (14, 14') the segment surface of at least one of the bearing segments (12, 12') having a plurality of grooves (26, 26') oriented substantially transverse to the rotation direction (22, 22'), wherein:
each of the grooves (26, 26') has a front groove edge (262) and a rear groove edge (261) disposed relative to one another so that a point moving along the respective segment surface in the rotation direction first passes an intersection of the segment surface with the front groove edge (262) and then passes an intersection of the segment surface with the rear groove edges (261),
the rear groove edge (261) of each of the grooves (26, 26') is orientated obliquely to a rear radial plane (24, 24') that passes through both the axis and the rear groove edge (261), and each of the rear groove edges (261) is undercut in relation to the rear radial plane (24, 24'), and the front groove edges (262) of each of the grooves (26, 26') is oriented obliquely to a front radial plane (24, 24') that passes through both the axis and the front groove edge (262) and, each of the front groove edges (262) is not undercut in relation to the front radial plane (24, 24').

2. The hydrodynamic slide bearing (10,10') of claim 1, wherein the undercut rear groove edges (261) are arranged at an angle of 5° to 20° relative to the rear radial plane (24, 24').

3. The hydrodynamic slide bearing (10,10') of claim 1, wherein the grooves (26, 26') are arranged in a groove arrangement region (28, 28') that, in the rotation direction (22, 22'), begins at 60% to 65% of the segment length and ends at 90% to 95% of the segment length.

4. The hydrodynamic slide bearing (10,10') of claim 3, wherein the grooves (26, 26') are arranged in a groove arrangement region (28, 28') that extends over a central 60% to 90% of the segment width.

5. The hydrodynamic slide bearing (10,10') of claim 3, wherein the grooves (26, 26') occupy 10% to 60% of an area of the groove arrangement region (28, 28').

6. The hydrodynamic slide bearing (10,10') of claim 1, wherein at least some of the grooves (26, 26') are interrupted in their longitudinal extension direction.

7. The hydrodynamic slide bearing (10,10') of claim 6, wherein two of the grooves (26, 26') that are adjacent in the rotation direction have their interruptions arranged with respect to each other with an offset transverse to the rotation direction (22, 22').

8. The hydrodynamic slide bearing (10,10') of claim 1, wherein the running surface (16') is planar and is oriented perpendicular to the axis and wherein the bearing segments (12') are formed as circle ring sectors.

9. The hydrodynamic slide bearing (10,10') of claim 1, wherein the running surface (16) is curved and oriented coaxial to the axis and the bearing segments (12) are formed as hollow cylinder sectors.

10. The hydrodynamic slide bearing (10,10') of claim 1, further comprising oil supply regions (18, 18') that extends transverse to the rotation direction (22, 22'), at least one of the oil supply regions being disposed between every two adjacent bearing segments (12, 12'), thereby separating the adjacent bearing segments (12, 12').

* * * * *